Sept. 8, 1953     M. KASSER     2,651,184
VACUUM METHOD AND DEVICE FOR COOLING PRODUCE
Filed Nov. 14, 1949
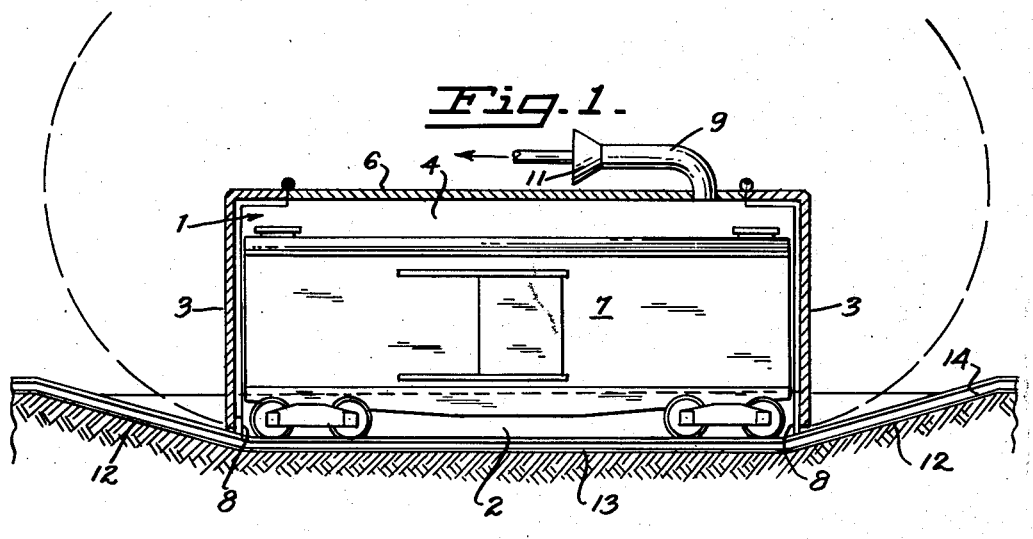
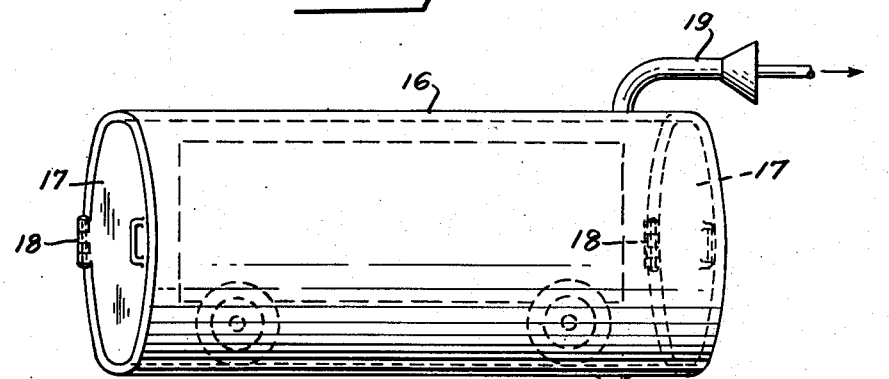
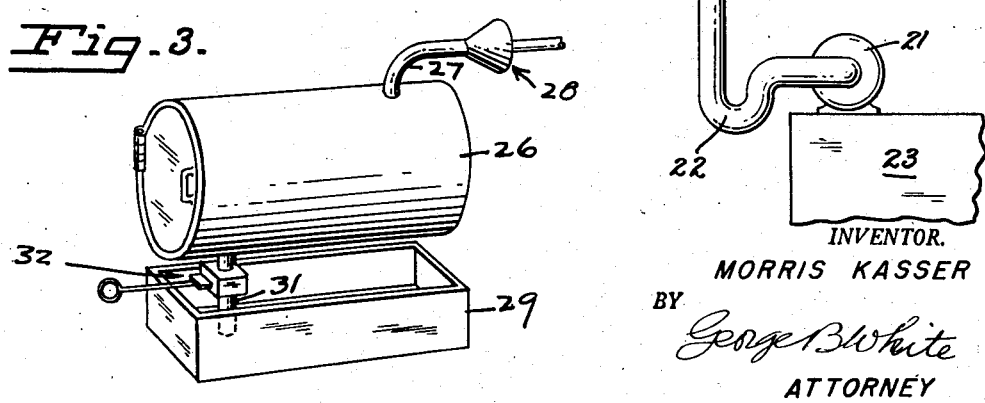
INVENTOR.
MORRIS KASSER
BY George B. White
ATTORNEY Patented Sept. 8, 1953

2,651,184

UNITED STATES PATENT OFFICE 2,651,184

VACUUM METHOD AND DEVICE FOR COOLING PRODUCE

Morris Kasser, Roseville, Calif.

Application November 14, 1949, Serial No. 127,001

10 Claims. (Cl. 62—89)

This invention relates to a method and apparatus for cooling perishable produce.

An object of this invention is to provide a method and apparatus whereby perishable produce, such as vegetables or fruit can be precooled for storage or shipping, or the like, in comparatively large quantities by substantially instantaneously drawing a vacuum around said produce.

Another object of this invention to to provide a method and apparatus wherein perishable produce is cooled by drawing a vacuum rapidly in the presence of or at the surface of a body of water.

Another object of this invention is to provide a method and apparatus wherein vegetable produce is cooled by immersing the produce into water, then withdrawing the water from the produce or removing the produce from the water, and drawing a vacuum about said produce while it is separated from said body of water, and in some instances also as it is immersed into the water.

Another object of this invention is to greatly reduce the air space with a vacuum chamber and around the produce to shorten the time for cooling said produce, and reduce the size of the jet vacuum system.

Other objects of the invention together with the foregoing will be set forth in the following description of the preferred method, and the preferred embodiment of means for practicing the same, which is illustrated in the drawings accompanying and forming part of the specification. It is to be understood that I do not limit myself to the embodiment disclosed in said description and the drawings as I may adopt variations of my preferred forms within the scope of my invention.

The invention is clearly illustrated in the accompanying drawings wherein:

Fig. 1 is a somewhat diagrammatic sectional sideview of the apparatus for precooling a carload of produce.

Fig. 2 is a somewhat diagrammatic perspective view of another precooling apparatus in accordance with my invention.

Fig. 3 is a somewhat diagrammatic sectional view of another cooling apparatus in accordance with my invention.

In carrying out my method a large quantity of produce, for instance an entire carload of produce, is introduced into a closed chamber, and rapid vacuum is drawn in the chamber by a suitable device, preferably by a so called injector pump.

It is preferable to have a body of moisture present when the vacuum is drawn, hence the bottom portion of the chamber contains a body of liquid, in this illustration reaching up, only to the bottom of the car. This is particularly advantageous when there is objection to submerging an entire car under water or other liquid.

For increasing the rapidity of the suction the quantity of produce or solids may be immersed into a body of water and then emerged and suction applied above the produce either or both during immersion and emergence. The displacement by the relative movement of the water accelerates the drawing of the desired vacuum.

My apparatus includes a chamber 1, which in the form shown in Fig. 1 has a pit 2, below the level of outwardly swinging doors 3 at each end. The walls 4 and top 6 of the chamber are as near as feasible to the sides of the railroad car 7 or vehicle usually used for shipping produce, so as to reduce the volume of the chamber 1 about the produce. Suitable abutments 8 for the doors 3 near the bottoms of the pit and around suitable door frames seal the opening around the doors when they are drawn and held shut by the suction in the chamber 1. A suction conduit 9 extends from the chamber 1 to an injection pump indicated at 11, which is of any suitable type, such as the type used in water vapor refrigeration.

The end 12 of the pit 2 inclines inwardly and downwardly to the abutments 8 and forms ramps to the bottom 13 of the pit. Suitable rails 14 lead down the ramps through the door abutments 8 and on the pit bottom 13 for the introduction and removal of railroad cars. The pit 2 is filled with liquid so that only the understructure of a railroad car is immersed therein, or if there is no objection to immersing the entire vehicle then the chamber 1 is filled completely.

When total immersion of the produce is desired a substantially tubular tank 16, shown in Fig. 2 may be utilized. A gate door 17 swings from its side hinge 18 to cover an end of the tubular tank 16. The other end of the tubular tank 16 is preferably permanently closed. A suction tube 19 leads from the top of the tank 16 to an injection pump, not shown. An outlet pump 21 is connected by an airtrap 22 to the bottom of the tank 16. A reservoir 23 contains water for operation. The pump 21 is preferably reversible.

The produce is placed in the chamber 1 or in the tank 16, and then a rapid vacuum is drawn by means of the injector pump.

In the tank 16 the entire load of the produce is covered with water by pumping water into the tank 16 while suction is created by the injector pump at the top. Then the water pump is reversed and the water is withdrawn, and the produce is again exposed to the cooling action of the vacuum pump as it emerges from the water.

Fig. 3 illustrates the performance of my method by eliminating the use of a liquid or water pump and using only the injector pump for drawing the water or liquid into the vacuum chamber to cover the produce, and thereafter open a valve to remove the water while the produce is still under vacuum. The structure in this form includes a suitable vacuum chamber 26 which may be arranged with suitable gates and tracks if desired. A conduit 27 connects the chamber to a suitable injector pump indicated at 28. A tank or reservoir 29 is disposed beneath the vacuum chamber 26 and is communicated with the bottom of said chamber by a comparatively large conduit 31, which latter in turn is controlled by a suitable gate valve 32. If the produce is placed into the chamber 26 and the chamber is closed, the injector pump draws a high vacuum and also the liquid into the chamber 26 until the produce is covered, then the gate valve 32 is closed and the high vacuum maintained. Then the gate valve 32 is opened and the water is allowed to flow out of the chamber 26 and back into the tank 29, thus creating vacuum behind it. The liquid in the tank 29 is exposed to atmospheric pressure.

The herein method and apparatus cools produce to the core rapidly and in large loads. It was found in practice that by cooling in combination with the immersion into and withdrawal from water, no small drops of water are left on the produce, which is particularly important in connection with certain fruits, such as grapes, where residual drops of water at the stem usually cause rotting. This is one of the advantages of my invention. In referring to water as the liquid used in the illustrative embodiments of my invention, I intend to include both pure water, and water treated with and containing any chemical or substance suitable for preservation or protection of produce.

I claim:

1. In a method of cooling produce, the steps of introducing the produce into a chamber, immersing said produce in liquid in said chamber and then emerging said produce from said liquid in said chamber, and applying air suction to said chamber throughout said immersion and emergence.

2. In a method of cooling produce, the steps of introducing the produce into a chamber, introducing liquid into the chamber to reduce the air space in said chamber, and then withdrawing the liquid from said produce and said chamber and creating a vacuum in said chamber simultaneously with said withdrawal of liquid.

3. In a method of cooling produce, the steps of introducing the produce into a chamber, introducing liquid into the chamber to reduce air space in said chamber, and then immediately withdrawing the liquid from said produce and said chamber and creating a vacuum in said chamber during said withdrawal of liquid and during said introduction of liquid.

4. A method of cooling stacked produce, the steps of introducing the stacked produce into a chamber in the presence of liquid, varying the level of the liquid, and drawing a rapid vacuum at the surface of said liquid as the liquid level rises and lowers in said chambers.

5. An apparatus for cooling produce comprising a closed chamber, a device to draw rapid vacuum in said chamber, openable means to allow entrance into and exit from said chamber, and a pit formed in the bottom of said chamber containing liquid.

6. An apparatus for cooling produce comprising a closed chamber, a device to draw a rapid vacuum in said chamber, openable means to permit entrance into and exit from said chamber, a pit formed in the bottom of said chamber containing liquid, said chamber conforming closely to the outline of the vehicle within which said produce is contained.

7. An apparatus for cooling produce comprising a closed chamber, a device to draw a rapid vacuum in said chamber, openable means to permit entrance into and exit from said chamber, and a pit formed in the bottom of said chamber containing liquid, said chamber conforming closely to the outline of a railroad car for said produce.

8. An apparatus for cooling produce comprising a closed chamber, a device to draw a rapid vacuum in said chamber, openable means to permit entrance into and exit from said chamber, a pit formed in the bottom of said chamber containing liquid, said chamber conforming closely to the outline of a railroad car for said produce, said pit extending up to about the bottom of said car.

9. An apparatus for cooling produce comprising a closed chamber, a device to draw a rapid vacuum in said chamber, openable entrance means to permit entrance into and exit from said chamber, a pit formed in the bottom of said chamber containing liquid, said chamber conforming closely to the outline of a railroad car for said produce, said pit extending up to about the bottom of said car and railroad tracks leading through said openable means into said pit.

10. In a method of cooling produce, the steps of introducing the produce into a chamber, drawing a liquid into the chamber until the produce is covered, then drawing a vacuum in said chamber, and then withdrawing the liquid from the chamber while the vacuum is maintained therein.

MORRIS KASSER.

References Cited in the file of this patent

UNITED STATES PATENTS

| Number | Name | Date |
|---|---|---|
| 1,328,657 | Fish | Jan. 20, 1920 |
| 2,116,813 | Weisser | May 10, 1938 |
| 2,285,331 | Doyle | June 2, 1942 |
| 2,304,192 | Newton | Dec. 8, 1942 |
| 2,422,557 | Kobiolke | June 17, 1947 |
| 2,425,816 | Maxson | Aug. 19, 1947 |
| 2,436,693 | Hickman | Feb. 24, 1948 |